May 20, 1947.  J. K. SMALL ET AL  2,420,915
BUTADIENE EXTRACTION
Filed Feb. 19, 1944
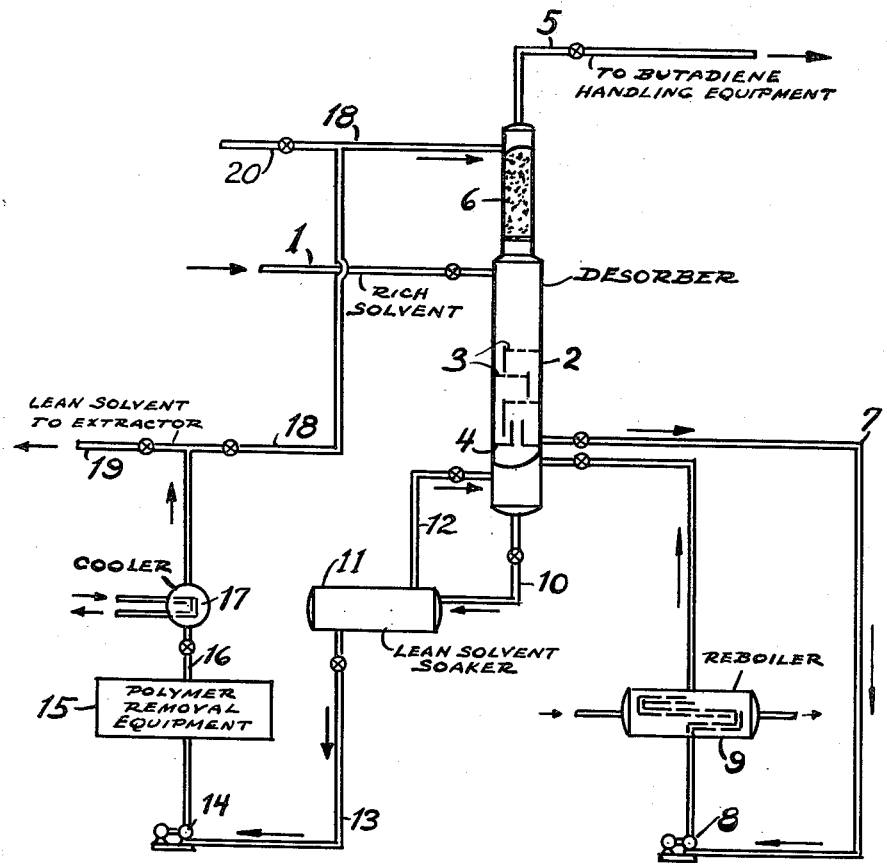
James K. Small
Richard A. Given  Inventors
By P. L. Young Attorney Patented May 20, 1947

2,420,915

UNITED STATES PATENT OFFICE 2,420,915

BUTADIENE EXTRACTION

James K. Small, Westfield, N. J., and Richard A. Given, Lake Charles, La., assignors to Standard Oil Development Company, a corporation of Delaware Application February 19, 1944, Serial No. 523,056

4 Claims. (Cl. 260—681.5)

This invention relates to improvements in the methods used for the separation of acetylenes from butadiene and particularly to improvements in the methods used for the separation of acetylenes from copper solutions used to absorb butadiene.

Butadiene when used in the manufacture of synthetic rubber and other synthesis is required to be substantially free of acetylenes. The maximum allowance of acetylenes is generally 0.10 weight per cent or less, based on the butadiene. As the hydrocarbons used as a source for butadiene usually contain substantially larger proportions of acetylenes of three and four carbon atoms per molecule to butadiene it is necessary to effect a separation of butadiene from the acetylenes. Since the acetylenes are absorbed strongly by the copper solutions used, in the concentration of butadiene, such as ammoniacal cuprous acetate, the extracted butadiene may contain an objectionally high concentration of acetylenes unless means are taken to prevent this.

One of the methods used in the separation of butadiene is to heat the copper solution. As the effective vapor pressure of the acetylene is relatively low when compared to that of butadiene, a good separation of butadiene from acetylenes and the copper solution is thereby obtained. But to remove all of the butadiene, higher temperatures are required, with the result that the vapor pressure of both the butadiene and acetylenes is increased substantially and it is no longer possible to obtain a good separation of the butadiene from the acetylenes as it is separated from the copper solution. One of the methods used in overcoming this difficulty is in soaking the solution at a relatively high temperature in order to polymerize the acetylenes which may be then readily separated. The disadvantage of polymerization of the acetylenes in the copper solution is that large soaking vessels and a high solvent inventory are required.

An object of this invention is to provide a method where less apparatus is required to separate the acetylenes from the cuprous solutions containing both acetylenes and butadiene. This object and other objects of the invention will be readily understood upon reading the following description with reference to the accompanying drawing, showing a diagrammatic sectional view of one particular flow plan that may be used.

Referring to the drawing, numeral 1 indicates a pipe through which a rich solvent obtained by contacting an ammoniacal cuprous acetate solution with a mixture of hydrocarbons containing both butadiene and acetylenes is passed into desorber 2. Desorber 2 is provided with a series of perforated plates 3; a packed tower may be used in place of the plates. The rich solvent containing both butadiene and acetylenes in solution flows downwardly over plates 3 and is collected in pan 4. The rich solvent is introduced into desorber 2 at a temperature of about 80° F. and maintained at a pressure of about 6–14 lbs./sq. in. gauge. Some of the butadiene is desorbed and removed from the desorber 2 through pipe 5 after first passing through a packed tower section 6. The ammoniacal cuprous acetate solution gathered on pan 4 is removed through pipe 7 and by means of pump 8 passed through heater 9 where the temperature is raised to about 180° F., and is returned to the bottom of the desorber 2 below pan 4. Substantially all of the butadiene and part of the acetylenes vaporized at this temperature pass upwardly through the desorber 2, the butadiene being removed through the pipe 5 while the acetylenes are largely reabsorbed in the solvent. Some polymerization of acetylenes will occur in the desorber, but it is generally desirable to provide additional time for acetylene polymerization, particularly when dealing with feed stocks high in acetylenes. The solvent is then passed through pipe 10 into a soaker 11 where this polymerization of acetylenes is accomplished. Some of the solvent substantially free of acetylene may be returned to the bottom of the desorber 2 by means of pipe 12, although this may be omitted. The remaining part of the copper solution and the polymer are then passed through pipe 13 and by means of pump 14 passed through a polymer removal equipment 15 which may be filters or other means of separating the solid or viscous acetylene polymers from the copper solution. The copper solution is then passed by means of pipe 16 through cooler 17 and a part may be passed if the acetylene content is substantially less than 0.04 mol per liter, by means of pipe 18 to the upper part of the desorber 2 above the packed section 6 where it flows downwardly through the desorber 2 and reabsorbs any acetylene that may have reached the upper parts of the desorber 2. The remaining part of the copper solution is then passed through pipe 19 to the extractor (not shown). Pipe 20 may be used to pass fresh ammoniacal cuprous acetate solution substantially free of acetylene to pipe 18 and upper part of desorber 2.

It is essential that the solvent supplied to upper part of the desorber has a substantially lower acetylene content than the rich solvent that is passed to the desorber to obtain butadiene and which also contains acetylenes. The maximum $C_4$ acetylene content of ammoniacal cuprous solution at 80° F. and 10 lbs./sq. in. pressure (gauge) to give less than 0.1% acetylene in the gas is about 0.06 to 0.08 mol per liter. The process under these conditions of temperature and pressure with good contact in the packed tower of the absorber and with the copper solution added to the packed tower having an acetylene content below about 0.04 to 0.02 mol per liter yields a butadiene with an acetylene content below 0.10 weight per cent.

The composition of the solvent used was

|  | Mols/liter |
|---|---|
| Cuprous copper | 3.0 |
| Cupric copper | 0.3 |
| Total $NH_3$ | 11.0 |
| Acetate ion | 4.0 |
| Water | Balance |

It will be understood that the specific copper solutions and reaction conditions described above are presented for purpose of illustration and that this invention is also applicable with other copper solutions useful for selective extraction of diolefins from mixtures containing diolefins and also either olefins or paraffins or both, the conditions of temperature, pressure, and the like for absorption and subsequent desorption of the diolefin being suitably adjusted to the particular solvents and hydrocarbon mixtures under consideration. The rich solution initially obtained on absorbing diolefins in the copper solution will also contain appreciable amounts of most of the other hydrocarbons present in the feed stock. This mixture may be stripped of substantially all the undesirable components by known fractionation methods, such as by passage down a tower countercurrent to butadiene which is introduced at the bottom of the tower. Similarly the bottom of the stripping tower may be heated to effect selective desorption of the undesired hydrocarbon compounds. Such stripping treatment was, in fact, applied to the rich solvent prior to its passage into the desorber, in the example presented above.

We claim:

1. The method of separating butadiene from compositions containing butadiene and acetylenes which comprises introducing into an intermediate part of a desorber a solution of copper salt capable of forming addition compounds with butadiene and acetylenes, said solution being relatively rich in butadiene, desorbing a part of the butadiene content of said rich solution and withdrawing the solution from a lower point in the desorber to a heating zone, heating the withdrawn solution to desorb a further quantity of butadiene, reintroducing the heated solution at a still lower point in the desorber to permit the vapor of butadiene released from said heated solution to flow countercurrent to the first-named rich solution, thus leaving some acetylenes in a lean solution, withdrawing said lean solution from the lower part of said desorber to a heating zone, heating said lean solution to polymerize said acetylenes and removing said acetylenes to recondition said solution for further use, a part of said reconditioned solution being recycled to a point above said intermediate part.

2. The method of separating butadiene from compositions containing butadiene and acetylenes which comprises introducing into an intermediate part of a desorber a solution of copper salt capable of forming addition compounds with butadiene and acetylenes, said solution being relatively rich in butadiene, desorbing a part of the butadiene content of said rich solution and withdrawing the solution from a lower point in the desorber to a heating zone, heating the withdrawn solution to desorb a further quantity of butadiene, reintroducing the heated solution at a still lower point in the desorber to permit the vapor of butadiene released from said heated solution to flow countercurrent to the first-named rich solution, thus leaving some acetylenes in a lean solution, withdrawing said lean solution from the lower part of said desorber to a heating zone, heating said lean solution to polymerize said acetylenes, removing said acetylenes to recondition said solution for further use and recycling said reconditioned solution to an enriching point, a part of said reconditioned solution being recycled to a point above said intermediate part.

3. The method of separating butadiene from compositions containing butadiene and acetylenes which comprises introducing into an intermediate part of a desorber a solution of copper salt capable of forming addition compounds with butadiene and acetylenes, said solution being relatively rich in butadiene, desorbing a part of the butadiene content of said rich solution and withdrawing the solution from a lower point in the desorber to a heating zone, heating the withdrawn solution to desorb a further quantity of butadiene, reintroducing the heated solution at a still lower point in the desorber to permit the vapor of butadiene released from said heated solution to flow countercurrent to the first-named rich solution, thus leaving some acetylenes in a lean solution, withdrawing said lean solution from the lower part of said desorber to a heating zone, heating said lean solution to polymerize said acetylenes and removing said acetylenes to recondition said solution for further use and passing a part of said reconditioned solution to a point substantially above said intermediate part of said desorber for the purpose of removing acetylenes contained in said desorbed butadiene.

4. The method of separating butadiene from a composition containing butadiene and an acetylene which comprises introducing into an intermediate zone of a desorbing system a solution of a copper salt capable of absorbing butadiene and acetylenes, said solution being relatively rich in butadiene, desorbing a part of said butadiene from said relatively rich solution and passing said desorbed butadiene upwardly from said intermediate zone while passing said solution downwardly to a withdrawal point in said zone, withdrawing said partly desorbed solution from said point to a heater and heating such withdrawn solution to a higher temperature to cause further desorption of said butadiene, reintroducing said heated solution into a lower desorbing zone of said desorber system to permit butadiene vapors released from said heated solution to pass upwardly countercurrent to said first-named relatively rich solution, thus leaving some of said acetylene in a relatively lean solution, withdrawing said lean solution from a lower part of said lower zone, removing said acetylene from said lean solution and recycling at least a part of said lean solution to said desorber.

JAMES K. SMALL.
RICHARD A. GIVEN.

REFERENCES CITED

The following references are of record in the file of this patent:

UNITED STATES PATENTS

| Number | Name | Date |
|---|---|---|
| 2,275,135 | Fasce | Mar. 3, 1942 |

FOREIGN PATENTS

| Number | Country | Date |
|---|---|---|
| 264,245 | Germany | Sept. 9, 1913 |

OTHER REFERENCES

Ser. No. 289,710, Nata (A. P. C.) pub. May 18, 1943.